Sept. 17, 1929.  A. F. MASURY  1,728,876
FLEXIBLE CONNECTION FOR MOTOR VEHICLE PANELS
Filed Sept. 1, 1928
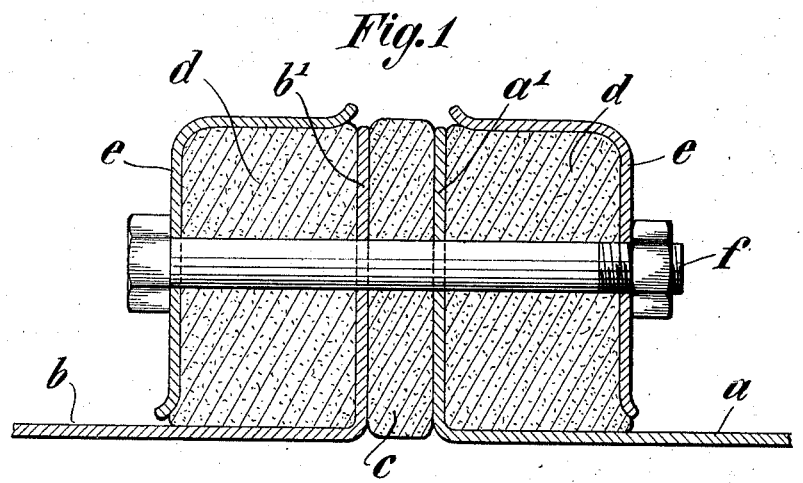
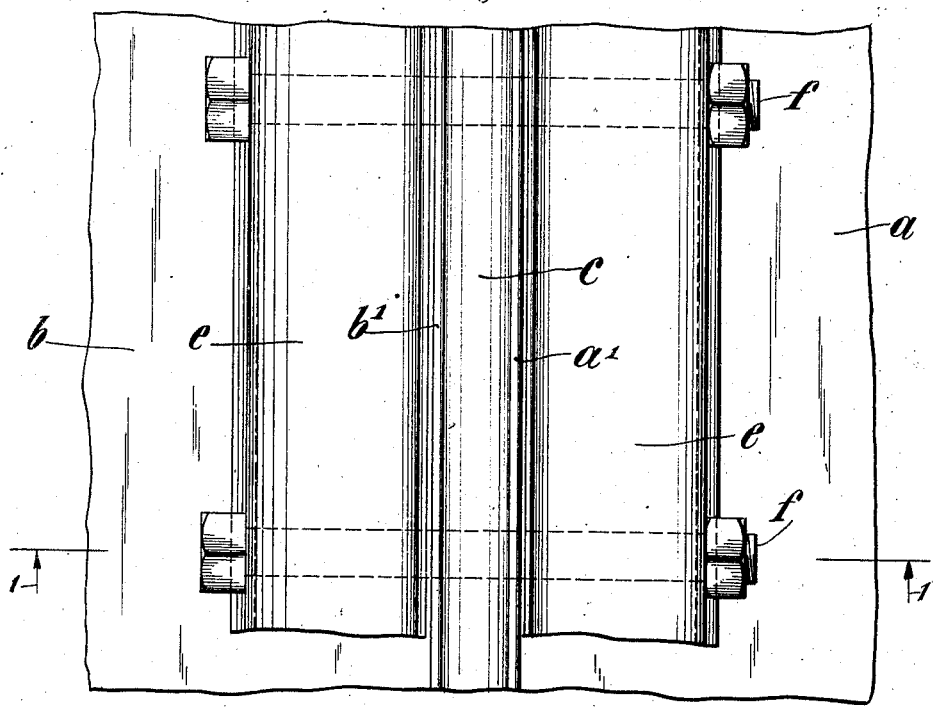
Inventor
Alfred F. Masury,
By his Attorneys
Redding, Greeley, O'Shea & Campbell Patented Sept. 17, 1929

1,728,876

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,467.

The present invention relates to motor vehicle body constructions which include a plurality of panels for sectionalizing the body. It has been found desirable to connect these panels in a manner to permit a degree of relative movement therebetween in order to accommodate weaving of the vehicle body. The difficulty of providing connections of this character which are easily manufactured and assembled and secure the sections together effectively has long been recognized and the development of bodies employing this type of construction has been seriously retarded by reason thereof.

More specifically, this invention relates to an improved form of connection between panels of the above character whereby relative movement between such panels is yieldingly accommodated and squeaks and body noises are completely eliminated. Accordingly, an object of the invention is to provide a connection of this character which is not only strong but also easy to manufacture and assemble, thus materially reducing the cost thereof and enabling the connections to be formed by stamping operations.

The present invention is characterized by the provision of panels which are formed at their adjacent edges with parallel extensions. A non-metallic yielding moulding is mounted between the extensions to space the panels apart and separate strips of moulding are mounted upon the opposite sides of the extensions. Independent cover strips are secured to the connection by bolts which pass through the extensions as well as the moulding.

Further objects and advantages will appear as the description proceeds and reference will now be had to the accompanying drawings, wherein:

Figure 1 is a view in section taken on line 1—1 of Figure 2 and looking in the direction of the arrows, showing one form of the invention.

Figure 2 is a plan view of the connection shown in Figure 1.

Referring to the above drawings, $a$ designates a panel forming a portion of the body of a vehicle and provided with an angular extension or flange $a'$. An adjacent panel $b$ is provided with a similar flange $b'$ and a strip of yielding non-metallic material $c$, such as rubber, is received between the flanges $a'$ and $b'$ to space the panels apart. Strips of yielding non-metallic material $d$ are carried on the opposite sides of the flanges $a'$ and $b'$ and metallic plates $e$ lie over the strips $d$ to confine the latter under compression. Bolts $f$ extend through the plates and flanges, as well as the strips of yielding non-metallic material and enable a desired degree of compression to be set up in the yielding material.

It will be seen that the above connection is easily manufactured by simple stamping operations and affords a means for securely connecting the panels together while permitting a degree of movement therebetween. Such relative movement is yieldingly resisted and body squeaks and drumming is effectively eliminated by reason of the fact that no metal to metal contact takes place between the panels. It will be apparent that the specific construction may be changed to suit varying conditions and the invention is not to be limited, save as defined in the appended claim.

I claim as my invention:

A connection of the character described comprising a panel, an adjacent panel to be connected thereto, flanges on the adjacent edges of the panels and extending at right angles thereto, non-metallic yielding moulding between the flanges and spacing them apart, non-metallic yielding moulding of rectangular cross section on the opposite sides of the flanges and engaged on two sides by the flanges and panels, L-shaped cover strips for the last named moulding engaging the same on two sides whereby it is confined at all four sides under compression, and bolts extending through the moulding and flanges and securing the strips together.

This specification signed this 27 day of August, A. D. 1928.

ALFRED F. MASURY.